Jan. 16, 1968   N. L. PETERS   3,363,934
AUTOMOBILE FRAME

Filed May 19, 1967   2 Sheets-Sheet 1

INVENTOR.
NORMAN L. PETERS
BY
ATTORNEY.

Jan. 16, 1968   N. L. PETERS   3,363,934
AUTOMOBILE FRAME
Filed May 19, 1967   2 Sheets-Sheet 2
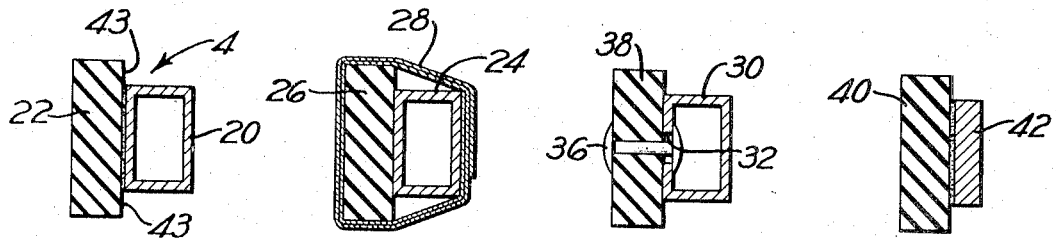
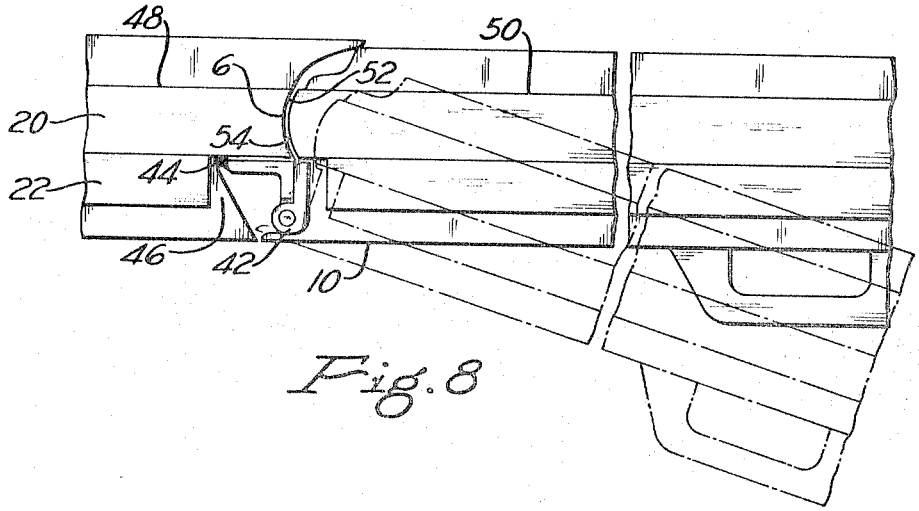
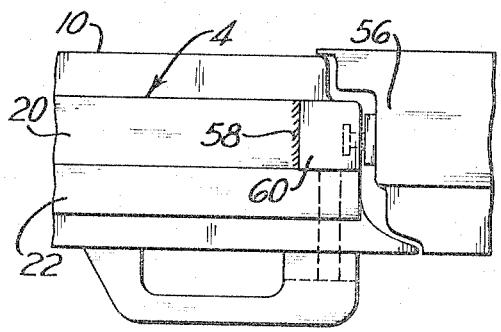   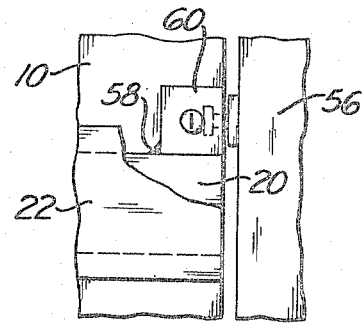
INVENTOR.
NORMAN L. PETERS
BY
ATTORNEY.

United States Patent Office 3,363,934
Patented Jan. 16, 1968

3,363,934
AUTOMOBILE FRAME
Norman L. Peters, 1502 N. Main St. Extension,
Butler, Pa. 16001
Filed May 19, 1967, Ser. No. 639,757
3 Claims. (Cl. 296—28)

ABSTRACT OF THE DISCLOSURE

This patent discloses providing an automobile with a frame that has, as a safety feature, a horizontal bar member that is made, for example, of rubber joined to steel tubing by riveting, cementing, or binding. While out of sight, so as not to detract from the external appearance of the automobile, the bar member runs peripherally about at least the forward half of the automobile, and possibly about it entirely.

Background of the invention (1) *Field of the invention.*—This invention relates to automobile frames, and in particular, to a frame that has, as a safety feature, a horizontal bar member having an exterior portion of rubber or other resilient material, joined to a strength-imparting core, which may, for example, be made of steel tubing.

(2) *Description of the prior art.*—It is known, for example, from U.S. Patent No. 3,110,515 to provide an automobile with a body-fender structure extending about the periphery of the vehicle. Such structure has two main drawbacks: First, the external appearance of the vehicle is altered, and second, it is difficult or impossible, consistent with obtaining a reasonably good external appearance, to provide adequate occupant-protecting strength in such external members.

It is also known, for example, from U.S. Patent No. 2,986,419, to provide an automobile with an exterior guardrail of rubber or other resilient material. As above, the external appearance of the car is affected, and substantial occupant-protecting strength is not provided.

Summary of the invention

In accordance with the instant invention, there is provided an automobile having a frame that has a horizontal bar member disposed internally of the vehicle, so as not to detract from its external appearance. The bar member comprises a metal core, which may, for example, be made of steel tubing, and exteriorly thereof, and joined thereto, as by riveting, cementing, or binding, a member of rubber, preferably semi-hard. The generally horizontal bar member extends peripherally about at least the front half of the automobile, and possibly about it entirely. As an optional feature, a roll bar, similarly made of steel tubing and rubber, is provided to protect the occupants in the event of the overturning of the automobile.

Brief description of the drawings

A complete understanding of the invention may be obtained from the foregoing and following description thereof, taken together with the accompanying drawings, in which:

FIG. 4 is a view taken along the line IV—IV of FIG. 3;

FIGS. 5–7 are cross-sectional views showing modes of construction that may be used in place of that shown in FIG. 4;

FIG. 8 is a fragmentary plan view taken on the line VIII—VIII of FIG. 2;

FIG. 9 is a fragmentary plan view taken on the line IX—IX of FIG. 2; and

FIG. 10 is a fragmentary elevation view taken on the line X—X of FIG. 3.

Description of the preferred embodiment

Figure 1:
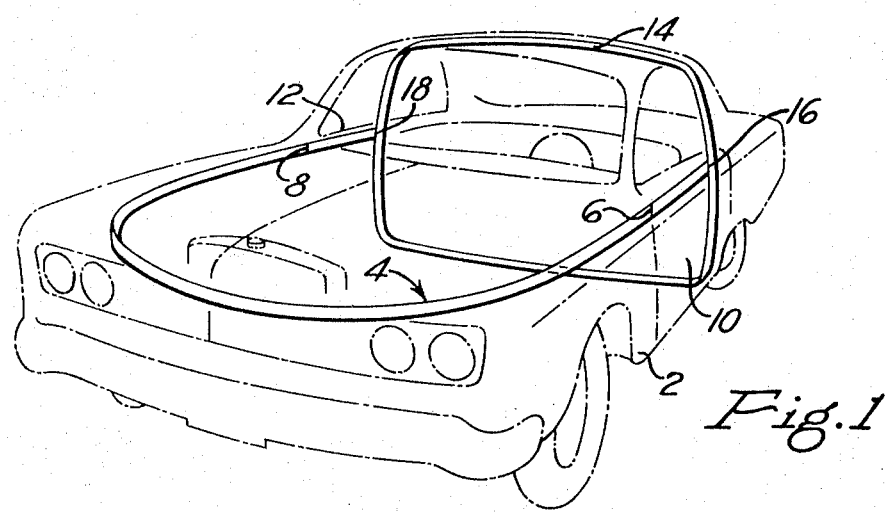
FIGURE 1 is a phantom view of an automobile provided with a bar member in accordance with the instant invention.

As shown in FIG. 1, an automobile 2 is provided interiorly, as a part of the frame, with a generally horizontal bar member 4. The member 4 runs peripherally about the front half of the automobile 2, and it contains a pair of knuckles 6 and 8, to permit opening and closing of the doors 10 and 12 of the automobile. FIG. 1 further shows a roll-over bar 14, to protect occupants in the vehicle in the event of its overturning. The bar 4 is joined to the roll-over bar 14 as by welded joints 16 and 18 in the rear jambs of the front doors of the automobile.

Figure 2:
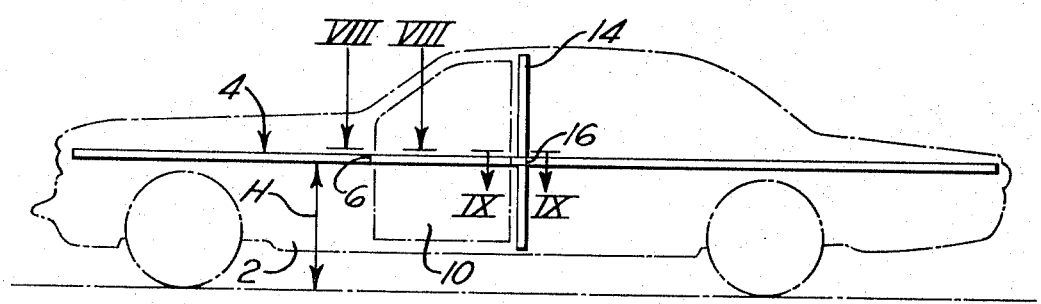
FIG. 2 is an elevation view of an automobile provided with a bar member in accordance with the instant invention.
Figure 3:
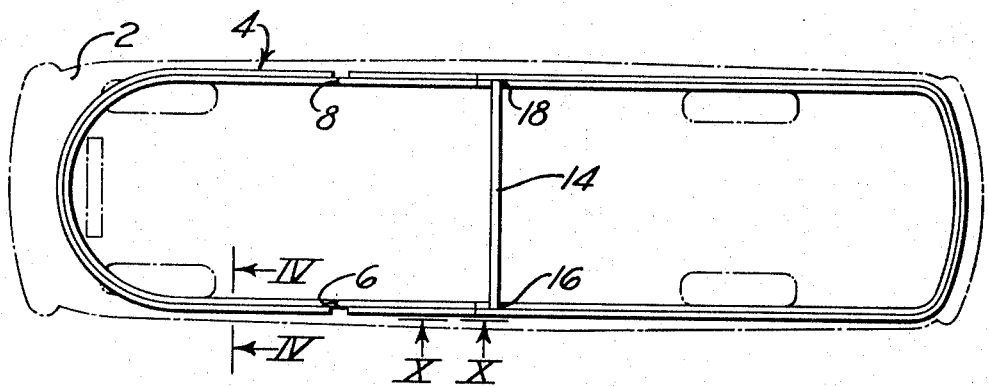
FIG. 3 is a plan view of an automobile provided with a bar member in accordance with the instant invention.

FIGS. 2 and 3 show an alternative embodiment of the invention, in accordance with which the safety bar 4 extends around the entire periphery of the vehicle. It will be desirable, moreover, to have the distance H indicated on FIG. 2 be the same with respect to all automobiles provided with safety bars in accordance with the invention, in order to minimize the extent to which vehicles run together in the event of a collision.

As shown in FIG. 4, the safety bar 4 may be made of a core of steel tubing 20 having cemented thereto a rubber member 22, which is preferably of semi-hard rubber.

FIG. 5 shows an alternative embodiment, in accordance with which there is provided a steel tubing core 24 and a rubber member 26 that are joined by tape 28, which serves to bind together the steel member 24 and the rubber member 26.

FIG. 6 shows yet further an alternative embodiment of the invention, in accordance with which there is provided a steel core member 30 having therein an opening 32 through which there may be passed a rivet 36 to join the rubber strip 38 to the member 30.

FIG. 7 shows yet another alternative embodiment of the safety bar of the invention, in which a rubber member 40 is cemented to a steel member 42, which may advantageously be made of spring steel or other high-strength resilient metal.

As can be seen from FIGS. 4–7, it is a feature of the invention that the resilient part, such as rubber member 22, has edges 43 that extend above and below the steel member to which it is joined, to obviate metal-to-metal contact and resultant welding in the event of a collision.

As best seen in FIG. 8, the construction of the knuckle joint 6 is such that the door 10 may be opened and closed by swinging about a hinge 42, which is connected to the car frame, passing from the closed position indicated in solid lines to an open position indicated in dash-dot lines. The hinge 42 is welded to the metal member 20 as at 44. There is a discontinuity as at 46 in the rubber member 22, to accommodate the hinge 42. The steel tubing member 20 is made in two parts, a forward part 48 and a rear part 50, the forward part 48 having a concave portion 52 that matches a convex portion 54 of the part 50. It will be understood that alternative modes of construction are possible; for example, the part 48 may be convex and the part 50 concave, or one of the parts 48 and 50 may have a portion of reduced diameter adapted to nest within the other of said parts when the door 10 is closed.

Moreover, as best seen in FIGS. 9 and 10, the bar 4 is secured to the rear jamb 56 of the door 10 by being welded as at 58 to the door lock 60.

While I have shown and described herein certain embodiments of my invention, I intend to cover as well any change or modification therein which may be made without departing from the spirit and scope of the invention.

I claim as my invention:

1. An automobile frame having a bar member extending substantially about the periphery of at least the front half of said automobile in a generally horizontal plane and disposed interiorly of said automobile, said generally horizontal bar member comprising a core member of steel and, exteriorly thereof, a strip member of resilient material joined thereto.

2. An automobile frame as defined in claim 1, characterized in that said strip member has edges that extend above and below said core member.

3. An automobile frame as defined in claim 2, characterized in that said resilient strip member is made of rubber and is cemented to said core member and in that said core member is made of steel tubing.

References Cited

UNITED STATES PATENTS

| | | |
|---|---|---|
| 2,312,052 | 2/1943 | Premo. |
| 2,785,921 | 3/1957 | Barenyi. |
| 2,986,419 | 5/1961 | Barenyi _____ 293—62 |
| 3,110,515 | 11/1963 | Loftin. |
| 3,226,146 | 12/1965 | Behr. |

FOREIGN PATENTS 90,205  8/1921  Switzerland.

BENJAMIN HERSH, *Primary Examiner.*

J. A. PEKAR, *Assistant Examiner.*